US006740422B1

United States Patent
Eggers et al.

(10) Patent No.: US 6,740,422 B1
(45) Date of Patent: *May 25, 2004

(54) HIGH LUSTER, FLEXIBLE MULTILAYERED FILM WITH A POLYAMIDE OUTER LAYER CONTAINING NANODISPERSED FILLING MATERIAL AND UTILIZATION OF SAID FILM FOR PACKAGING FOODSTUFFS

(75) Inventors: Holger Eggers, Freiburg (DE); Gregor Kaschel, Bomlitz (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/807,094

(22) PCT Filed: Oct. 4, 1999

(86) PCT No.: PCT/EP99/07349

§ 371 (c)(1),
(2), (4) Date: Apr. 9, 2001

(87) PCT Pub. No.: WO00/23508

PCT Pub. Date: Apr. 27, 2000

(30) Foreign Application Priority Data

Oct. 16, 1998 (DE) .......................................... 198 47 845

(51) Int. Cl.⁷ .............................................. B32B 27/34
(52) U.S. Cl. ................................ 428/474.9; 428/476.1; 428/349; 428/347
(58) Field of Search .............................. 428/343, 411.1, 428/423.5, 435, 458, 474.4, 474.7, 474.9, 475.5, 477.7, 476.1, 349, 347; 524/230, 232, 606

(56) References Cited

U.S. PATENT DOCUMENTS

| 5,496,918 A | * | 3/1996 | Khanna et al. ............. 528/323 |
| 5,504,128 A | * | 4/1996 | Mizutani et al. ............ 524/104 |
| 5,747,560 A | | 5/1998 | Christiani et al. .......... 523/209 |
| 5,876,812 A | | 3/1999 | Frisk et al. ................. 428/35.7 |
| 5,916,685 A | * | 6/1999 | Frisk .......................... 428/323 |
| 5,972,448 A | | 10/1999 | Frisk et al. ................. 428/35.7 |
| 6,346,285 B1 | * | 2/2002 | Ramesh ..................... 383/113 |

FOREIGN PATENT DOCUMENTS

| DE | 19 705 998 | 12/1997 |
| DE | 19 631 348 | 2/1998 |
| EP | 0 358 415 | 3/1990 |
| EP | 0 810 259 | 12/1997 |
| EP | 0 818 508 | 1/1998 |
| WO | 93/04118 | 3/1993 |
| WO | 93/11190 | 6/1993 |

OTHER PUBLICATIONS

Printout from www.devicelink.com, May 2002, 7 pages.*

* cited by examiner

Primary Examiner—Rabon Sergent
Assistant Examiner—Melanie Bissett
(74) Attorney, Agent, or Firm—Norris McLaughlin & Marcus

(57) ABSTRACT

Described is a flexible, multilayered film comprising, (i) an outer layer composed substantially of polyamide containing nanodispersed filing material (e.g., in an amount of from 0.1 and 3 wt. %), and (ii) at least one additional polyamide layer. The multilayered film of the present invention may be produced by flat film or blown film methods. Also described is a method of using the multilayered film of the present invention as a packaging for foodstuff.

12 Claims, No Drawings

HIGH LUSTER, FLEXIBLE MULTILAYERED FILM WITH A POLYAMIDE OUTER LAYER CONTAINING NANODISPERSED FILLING MATERIAL AND UTILIZATION OF SAID FILM FOR PACKAGING FOODSTUFFS

The present invention relates to a flexible, multilayer film having an outer layer composed essentially of polyamide 6 that contains between 0.1 and 3.0% of a nanodisperse nucleating agent, and at least one further polyamide. The multilayer film according to the invention is notable for good optical properties accompanied by high strength and good slip. The multilayer film can be produced without difficulty, in particular on blown-film plants. The multilayer film can be processed without difficulty using a suitable heat-sealable coating on modern moulding, filling and sealing packaging machines at high packing speeds. The packages produced are optically attractive and resistant to mechanical stress. The invention also comprises the use of the multilayer film according to the invention as a container, in particular for the packaging of foodstuffs, and also the use as thermoformed film. In the context of the present invention, a nanodisperse filler is understood in this connection as meaning a filler whose smallest particles that form a rigid unit in the dispersion have a dimension of not more than 100 nm as a number-weighted average of all the particles in at least one direction that can be chosen arbitrarily for each particle.

Polyamide-based films are by far predominantly used to package perishable foodstuffs. The structure of suitable films is set out, for example, in The Wiley Encyclopedia of Packaging Technology (ed. M. Bakker and D. Eckroth; John Wiley & Sons, 1986) and also in Kunststoff-Folien by Joachim Nentwig (Carl Hanser Verlag 1994, Munich).

As barrier layer material in flexible multilayer films or composite films, usually in combination with low-density polyethylene (LDPE), polyamides have acquired increasing importance for packaging perishable foodstuffs over many years. In this field, polyamide 6 (PA 6) has acquired the greatest share. The annual consumption of PA 6 for this market is currently around 35,000 tonnes in Europe and about 85,000 tonnes world-wide; in addition, a few thousand tonnes of copolyamides are used.

By far the largest quantity of said multilayer films is produced using PA 6 types in, various flat-film processes. For blown-film composites, special copolyamides are usually used.

Copolyamides are almost exclusively processed by the blown-film coextrusion process. Their solidification rate or crystallization rate during the cooling phase is markedly slower than pure PA 6 products. As a result, despite the relatively low cooling rate of the molten tube through air cooling, it is possible to produce PA/PE composite films having a high transparency. The copolyamides that are conventional in this connection are nowadays also partly used with various modifications, such as nucleation agents and processing aids, for example an asymmetrical PE-X-PA blown coextrusion film (X=coupling agent) for the PA outer layer to improve free running in machines and dimensional stability. Small losses in transparency due to the crystallizing action of the nucleating agents are, as a rule, accepted because of the other advantages.

In many cases, films are necessary that have been produced as blown film. An advantage of a blown film is the better uniformity of the film roll compared with flat films as the result of a changing take-up. As a result, the blown film is given a flatness that is markedly superior to a flat film. This is advantageous for fast machine running.

According to the prior art, an outer polyamide layer is used because of the outstanding thermal stability and abrasion resistance.

The disadvantages that increase as a result of the use of copolyamides reside in the post-crystallization of the film. Because of the low crystallization rate of these systems, the crystallization is still not complete with the actual forming. On the contrary, subsequent to the actual production of the film, a post-crystallization takes place over a fairly long time interval, as a result of which, due to the dimensional change in the polyamide-containing film accompanying the post-crystallization, the multilayer film may curl up and/or may shrink considerably, resulting in flatness deficiencies on the roll, and is consequently no longer suitable for further processing.

In addition, because of the lower crystallinity compared with PA 6, copolyamides have the disadvantage of a markedly poorer surface slip. This is relevant in the case of the outer polyamide.

Not least of all, the production of the copolyamides even requires the use of mores expensive raw materials and polymerization procedures than the production of PA 6. In this respect, the use of copolyamides results in an even greater consumption of resources.

In this respect, there is a need, not covered at present, for blown films having a polyamide outer layer that have both good optical properties and good machine free running in the context of good surface slip. The best existing solution in the prior art is to use nucleated copolyamide. However, compared with the use of polyamide 6, this solution has a marked disadvantage because of the more exotic and expensive copolyamide raw material.

A further important property is a high mechanical resistance. This relates, in particular, to a high resistance to destruction as a result of buckling and bending, referred to below as loop strength, and also a high resistance to puncture by sharp objects, referred to below as puncture strength.

Nucleating agents, such as the systems mentioned above for use in copolyamides, have been prior art for a fairly long time. They also serve as crystallization nuclei during slight supercooling of the melt around which spherulitic structures form during the solidification process. Depending on dispersion and effectiveness, such nucleating agents achieve, in this way, the development of a crystal structure containing more and finer spherulites than in the unnucleated polymer, even in the case of slow cooling from the melt, as in the case of blown-film production. Post-shrinking as a result of post-crystallization can thereby be minimized. The loading of the moulding composition with nucleating agents is, however, restricted by the light-scattering properties of the nucleating agents themselves.

The addition of very fine-grain solid particles in the size range below one micrometer to polymeric matrices and especially polyamides has likewise been described for a fairly long time. Such systems are primarily used to increase the mechanical rigidity, the barrier to gases and the heat resistance, and also to reduce the cycle time, for instance, during injection moulding, the flammability or the moisture absorption in the case of hydrophilic systems. Systems that, in contrast to the abovementioned nucleated polyamides, retain their transparency despite greater additions of nanoscale particles have also been described.

EP-A-358415 describes a polyamide resin moulding composition containing sheet silicate uniformly dispersed in it, in which the individual layers of the sheet silicate may have thicknesses around 1 nm and side lengths of up to 1 $\mu$m. The layers are separated in the polyamide matrix by suitable breakdown and are at distances from one another of around 10 nm. Mouldings, such as, for example, films, produced with this material composed of polyamide 6 as base polymer are notable, compared with those of pure polyamide 6, for a significantly increased oxygen barrier and rigidity. To an equal extent, however, the loop strength decreases markedly. The transparency of single-layer amorphously quenched flat films and also water-cooled blown films having the structure polyamide mixture//coupling agent//LDPE remains unaltered compared with purepolyamide 6. Consequently, the structures used do not achieve the necessary property profile for the present application.

WO 93 04118 and WO 93 11190 and WO 93 04117 disclose polymer nanocomposites containing likewise platelet-shaped particles in the thickness range of a few nanometers. In particular, composites are described that are composed of PA 6 and montmorillonite or of PA 6 and silicates. These materials can be processed to form films. Applications as monofilms and the possibility of producing multilayer films are described. In these cases, the films made from said material can optionally be stretched in order to achieve a still better orientation of the nanoparticles. Compared with those not containing nanoscale particles, such films exhibit a higher rigidity, a higher strength in the moist state, a better dimensional stability, a higher gas barrier and a lower water absorption. Such film structures are unsuitable for the present application case because of the unduly high rigidity and the low loop strength accompanying it.

EP-A-818508 discloses a mixture of 60 to 98% PA MXD6 containing 2 to 40% of an aliphatic polyamide that again contains inorganic particles in the size range of nanometers. Mixtures are described that contain, in particular, PA 6 as aliphatic polyamide. In addition, multilayer films are described as mouldings producible therefrom. Disclosed structures always contain the mixture described as an inner and/or outer layer. Structures containing the said layer and a layer that is situated on the outside of the film with PA 6 containing nanoparticles are also described. All the structures mentioned have as an advantage a high oxygen barrier that is not impaired even by sterilization. In contrast to films having EVOH as oxygen barrier layer, the films patented therein become only slightly cloudy as a result of the sterilization. Compared with a flat film composed of pure PA 6, such a film having the structure PA 6//(80% PA MXD6+20% PA containing nanoparticles)//PA 6 do not exhibit any appreciable improvement in transparency. Such structures containing a high proportion of PA MXD6 are unsuitable for the present application case simply because of the low loop strength of this material.

EP-A-810259 likewise describes a polyamide moulding composition containing nanodisperse fillers. The barrier action, desired therein, of the polyamide can be improved by adding sufficient finely-divided oxides, oxyhydrates or carbonates. Preferably, the particles have a diameter of less than 100 nm. The Patent also describes multilayer films containing at least one layer composed of this moulding composition, an improvement in the oxygen barrier always being the intention of using said moulding composition. The optical properties of the films moulded therefrom become poorer, however, compared with the system without additives. Such a system is therefore unsuitable for the present requirements.

WO 98 1346 likewise describes the use of nanodisperse fillers for improving the barrier properties of polymers. The publication especially discloses the constitution of a transparent multilayer structure whose outer layer contains a polymer having a proportion of between 0.1 and 10% of a dispersed platelet-shaped mineral and having a particle thickness of less than 100 nm dispersed within it, said outer layer being coated with a metal oxide on the side facing the centre of the structure. This is followed by a coupling layer and a further layer that serves as heat-sealable coating and that is preferably composed of polyolefins. The polymer of the outer layer may be a polyester or a polyamide. The structure has a high oxygen barrier and strength, accompanied by the retention of the transparency, and is used, for example, to produce tubular bags. In this case, said structure comprises only the outer layer containing the nanodisperse mineral as strengthening layer. Such a structure, but without metal oxide layer, proves unsuitable for the present application case because the film acquires a markedly higher rigidity as the result of the addition of the nanodisperse fillers, but becomes brittle to an equal extent and consequently markedly fails to meet, in particular, the requirements relating to loop strength.

The object arose of providing a flexible multilayer film that can be produced as a blown film and that has an outerlayer essentially composed of polyamide 6, which layer has a high gloss and a high transparency for the optimun presentation of the contents, it being essential for it to have not only a good processability on packaging machines but also an adequate loop strength and puncture strength to protect the contents.

According to the invention, this was achieved by providing a multilayer film optionally having a heat-sealable coating and having a polyamide outer layer containing nanoscale particulate nucleating agents and at least one further polyamide layer, wherein the polyamide forming the outer layer contains at least 90% polyamide 6, relative to the total mass of polyamide in said layer, the smallest constituents, forming a rigid unit in the dispersion, of the particles dispersed in the outer layer have as a number-weighted average of all the constituents a dimension of not more than 100 nm in at least one direction that can be arbitrarily chosen for each constituent.

during cooling of the outer layer from the completely molten state at a cooling rate of between 10° and 20° C. per minute, crystalline structures are produced that originate from the surface of the particles dispersed therein, all the further polyamide layers contain the particles contained in the outer layer at a level of not more than one tenth of the proportion by weight of particles in the outer layer, and the thickness of the outer layer is less than 50% of the total thickness of all the layers containing polyamide.

Preferably, the proportion by weight of the particles dispersed in the outer layer, relative to the total weight of the composition forming the outer layer, is between 0.1 and 3%, preferably between 0.2 and 2.0%.

The polyamide forming the outer layer may contain, in addition to polyamide 6polyamide of the types polyamide 10, polyamide 12, polyamide 66, polyamide 610, polyamide 6I polyamide 612, polyamide 6/66, polyamide 6I/6T, polyamide MXD6, polyamide 6/6I, polyamide 6/6T, polyamide 6/1PDI or other aliphatic or aromatic homopolyamides and copolyamides or mixtures thereof. Preferably, the outer layer, contains pure polyamide 6. Unduly high added amounts of other polyamides impair, in particular, the surface slip characteristics of the film.

The further layers, apart from the outer layer, composed of polyamide may in each case contain polyamide of the types polyamide 6, polyamide 10, polyamide 12, polyamide 66, polyamide 610, polyamide 6I, polyamide 612, polyamide 6/66, polyamide 6I/6T, polyamide MXD6, polyamide 6/6I, polyamide 6/6T, polyamide 6/IPDI or other aliphatic or aromatic homopolyamides and copolyamides or mixtures thereof. In a preferred form, mixtures of the said polyamides are used that contain at least 80 wt % of polyamide 6, relative to the total weight of the mixture. Particularly preferred is the use of pure polyamide 6 in said layers.

It is basically also possible to provide the further layers, apart from the outer layer, composed of polyamide with dispersed particles, as in the outer layer.

The layers composed of polyamide in the film according to the invention may also contain conventional further additives that improve the functionality of the film, such as lubricants, in particular ethylenebis(stearyl)amide. In addition, the outer layer may contain antiblocking agents. These are known solid inorganic particles that emerge from the outer surface of the surface and improve the surface slip behaviour of the film in this way. Suitable for this purpose are silicon oxide, calcium carbonate, magnesium silicate, aluminium silicate, calcium phosphate, talcum and the like. Of these, silicon dioxide is preferably used. Active amounts are in the range from 0.1 to 2 wt %, preferably 0.1 to 0.8 wt %. The mean particle size is between 1 and 15 μm, particles that have a spherical shape being particularly suitable in this connection.

The thickness of the outer layer is preferably not more than 40% of the total thickness of all the layers containing polyamide. Unduly high thicknesses of the layer (I) result in a multilayer film that is too brittle.

Preferably, particles whose smallest constituents forming a rigid unit in the dispersion have, in two mutually perpendicular, arbitrarily directions that can be chosen arbitrarily, a dimension in each case of at least ten times the size of the constituents in the direction with the smallest dimension of the constituent. The thickness of said particles is preferably less than 10 nm. The particles used in the outer layer are preferably sheet silicate. These may be selected from the group comprising phyllosilicates, such as magnesium silicate or aluminium silicate, and also montmorillonite, saponite, beidellite, nontronite, hectorite, stevensite, vermiculite, halloysite or their synthetic analogues.

To promote the heat sealability, the multilayer film according to the invention may have a heat-sealable coating on that side of the multilayer film that is remote from the outer layer. The heat-sealable coating consequently forms the inside of the multilayer film, which is adjacent to the contents. In a preferred form, the heat-sealable coating contains the polymers usually used as sealing medium or mixtures, of polymers from the group comprising copolymers of ethylene and vinyl acetate (E/VA), particularly preferably having a vinyl acetate content, relative to the total weight of the polymer, of not more than 20%, copolymers of ethylene and unsaturated esters, such as butyl acrylate or ethyl acrylate (E/BA or E/EA, respectively), copolymers of ethylene and unsaturated carboxylic acids (E/AA, E/MAA), particularly preferably having a content of the carboxylic acid comonomer, relative to the total weight of the polymer, of not more than 15%, in a still more preferred form of not more than 8%, salts of the copolymers of ethylene and unsaturated carboxylic acids, in particular E/MAA, (ionomers), particularly preferably having a content of the carboxylic acid comonomers, relative to the total weight of the ionomer, of not more than 15%, in a still more preferred form, not more than 10%, low-density polyethylene (LDPE), particularly preferably with a density of not less than 0.91 g/cm$^3$ and not more than 0.935 g/cm$^3$, high-density polyethylene (HDPE), copolymers (LLDPE) of ethylene and α-olefins containing at least 3 carbon atoms, for example butene, hexene, octene, 4-methyl-1-pentene. The copolymers (LLDPE) of ethylene and α-olefins can be prepared using conventional catalysts or with metallocene catalysts. Particularly preferred among the latter are copolymers (LLDPE) of ethylene and α-olefins having a density of not less than 0.90 g/cm$^3$ and not more than 0.94 g/cm$^3$.

The film according to the invention may also contain a heat-sealable coating of multilayer construction. Thus, the abovementioned polymers may be arranged, for instance for cost optimization, in such a way that the individual layer situated on the inside of the film and adjacent to the product may be notable for a particularly early start of sealing and the individual layer adjacent to the middle of the film thereon only melts at higher temperatures, but, on the other hand, is less expensive or only makes possible the producibility of such a multilayer heat-sealing coating as a blown film as a result of higher resistance to melting. In the heat-sealable coating, coupling polymers composed of the said substance groups or polymers produced on the basis of them, modified, for instance, with anhydride by grafting may also be used. Examples of such structures are the film sequences LDPE//E//VA or LDPE//E/AA//ionomer.

All the layers or individual layers of the heat-sealable coating may additionally be provided with additives that improve the functionality of the film. Examples are solid inorganic particles that are known as antiblocking agents and that emerge from the outer surface of the heat-sealable coating and improve the surface slip behaviour of the film in this way. Suitable for this purpose are silicon oxide, calcium carbonate, magnesium silicate, aluminium silicate, calcium phosphate, talcum and the like. Of these, silicon dioxide is preferably used. Active amounts are in the range: from 0.1 to 2 wt %, preferably 0.1 to 0.8 wt %. The mean particle size is between 1 and 10 μm, preferably 2 and 5μm, particles having a spherical shape being particularly suitable in this connection. In multilayer heat-sealable coatings, said particles are preferably used only in the outer individual layer. Other additives that improve the surface slip of the inside of the multilayer film, also in conjunction with the said solid particles, are the aliphatic acid amides, higher aliphatic acid esters, waxes, metal soaps and polydimethylsiloxanes that are usually described as lubricants. The active amount of lubricant is in the range of 0.01 to 3 wt %, preferably 0.02to 1 wt %. Particularly suitable is the addition of higher aliphatic acid amides in the range from 0.01 to 0.25 wt %. An aliphatic acid amide that is suitable, in particular, for the abovementioned polymers used in the heat-sealable coating is erucic amide.

In addition to the outer polyamide layer and, optionally, conventional additives and at least one further polyamide layer and, optionally, conventional additives and the heat-sealable coating, the multilayer film according to the invention may also contain one or more EVOH-containing layers to improve the oxygen barrier properties, in which connection the EVOH-containing layers preferably contain not less than 50 wt %, relative to the total weight of the respective EVOH-containing layer, of an EVOH containing not less than 85 and not more than 40 mol % of vinyl acetate that is not less than 90% saponified. In a particularly preferred form an, EVOH-containing, layer is disposed directly between two polyamide-containing layers, of which one may be the outer layer.

In addition to the polyamide outer layer and, optionally, conventional additives and at least one further polyamide layer and, optionally, conventional additives and, optionally, the EVOH-containing layer or layers and the heat-sealable coating, the film according to the invention may contain one or more coupling layers. Such a coupling layer is preferably a laminating adhesive based on polyurethane or polyester urethanes or an extrudable coupling agent. Modified polyolefins are preferably used as an extrudable coupling agent. In a preferred form, these are polyolefins containing carboxyl groups, such as, for example, polyethylene, polypropylene, ethylene/α-olefin copolymers or ethylene/vinyl acetate copolymers that are grafted with at least one monomer from the group comprising the α,β-monounsaturated dicarboxylic acids, such as, for example, maleic acid, fumaric acid, itaconic acid or their acid anhydrides, acid esters, acid amides and acid imides. In addition, copolymers of ethylene with α,β-monounsaturated dicarboxylic acids, such as acrylic acid, methacrylic acid and/or their metal salts with zinc or sodium and/or their alkyl ($C_1$–$C_4$) ester or corresponding graft polymers on polyolefins, such as, for example, polyethylene, polypropylene or ethylene/α-olefin copolymers that are graft-polymerized with a monomer of the said unsaturated acids are used as extrudable coupling agents. Particularly preferred are polyolefins with grafted α,β-monounsaturated dicarboxylic anhydride, in particular ethylene/α-olefin copolymers grafted with maleic anhydride. In general, the layers joined by a coupling agent do not have sufficiently high mutual adhesion. However, coupling agent layers may also be used between two directly coextrudable layers in order to modify, for instance, the flexibility of the film.

In addition to the polyamide outer layer and, optionally, conventional additives and at least one further polyamide, layer and, optionally, conventional additives, optionally, the EVOH-containing layer or layers and the heat-sealable coating and/or one or more coupling layers, it is basically also possible to provide the multiplayer film according to the invention with an inner layer whose composition is identical to that of the outer layer. Such a procedures does not, however, present any advantages with regard to the properties desired in the context of the object.

In addition to the polyamide outer layer and, optionally, conventional additives and at least one further polyamide layer and, optionally, conventional additives, optionally the EVOH layer or layers and the heat-sealable coating and/or one or more coupling layers, the multilayer film according to the invention may contain still other polymeric layers.

The multilayer film according to the invention may also be subjected to a stretching operation after extrusion. The orientation may take place only in the longitudinal direction, only in the trasverse direction, first in the longitudinal direction and then in the transverse direction, simultaneously in the longitudinal and transverse directions or in combinations of these steps. In this connection, the stretching can be performed for the entire multilayer film or for subcomposites thereof, in particular the outer layer.

The multilayer film according to the invention may be provided between two inner layers containing a layer of a metal oxide or nonmetal oxide represented as AOx. Said layer preferably has a thickness of 5 to 200 nm. In the empirical formula mentioned, x is between 1 and 2.5; A is preferably silicon, iron or aluminium.

The film according to the invention may be given an imprint on the outside, the inside or between individual layers.

Surprisingly, the film according to the invention makes it possible to provide a blown film having an outer PA layer and good optical properties without using copolyamides.

The multilayer film according to the invention thereby overcomes a disadvantage generally accepted by those skilled in the art for coextruded blown films.

The film according to the invention consequently makes it possible to minimize the use of raw materials, such as copolyamides, that are more costly to produce. This makes possible a resource-saving manufacture of the film according to the invention, compared with the prior art.

It was not to be expected that the film acquires, in addition, also good mechanical flexibility, accompanied by loop strength and puncture strength, as a result of the multilayer structure.

The optical properties of the multilayer film according to the invention are far superior to those of conventionally nucleated films.

The object of the invention is also the use of the multilayer film according to the invention for the preferably mechanized packaging of foodstuffs, in particular for the production of bags on tubular bag machines and also as blister film and cover film in thermoform packaging and sealing machines.

EXAMPLES

In the case of multilayer structures, the layer sequence is shown by stringing together the abbreviations for the polymers of the respective layers or symbols explained elsewhere, mutually separated by double oblique strokes. In this connection, the heat-sealable coating side is always on the right. At the same time, only a part of the entire layer sequence forming the film can also be specified. In such cases, the heat-sealable coating side is likewise always on the right and unspecified layers or combinations of layers are identified by three stops ( . . . ). Mixtures of different polymers are identified by the symbol + and also the summary of the components in brackets, ( ). Optionally, percentage composition can additionally be specified in this connection. Unless otherwise specified, in such cases, this always involves proportions by weight relative to the total weight of the mixture. Thus, the expression . . . //PA//EVOH/ . . . //(LDPE+LLDPE)//d describes a structure having an unspecified outer layer or outer layer sequence, followed by a layer composed essentially of polyamide, followed by a layer composed essentially of ethylene-vinyl alcohol copolymer (EVOH), followed by an unspecified layer or layer sequence, followed by a layer that comprises a mixture of low density polyethylene (LDPE) and an ethylene/α-olefin copolymer (LLDPE), and also a layer to be specified in greater detail by d that follows on the sealing side.

The following physical and application properties were measured on the samples manufactured as follows:

The frictional behaviour according to DIN 53 375. The frictional coefficients are measured for the static friction between film and film. It is always the polyamide outside of the exemplary film that is investigated. The measurement was carried out at 23° C.

The puncture strength as the necessary force, the necessary travel and the necessary work to puncture a film stretched in membrane fashion with a sharp test mandrel from the seal side. In this connection, the puncture work is found by experience to be best suited to assessing the strength with respect to sharp objects in practice. The measurement is made with an electronic class 1 tensile test machine according to DIN 51 221 at a test speed of 100 mm/min. For this purpose, circular samples having a diameter of 80 mm are taken from the film and clamped in membrane fashion in the specimen holder of the test apparatus having a diameter of 50 mm. The test mandrel is made of metal and has a diameter of 2 mm. At its tip, it tapers over a length of 5 mm to a diameter of 1 mm, the front part being rounded with a radius of 0.5 mm. The puncture work is given by integrating the force acting on the test mandrel over the path it traverses until the film fails. All the investigation steps were performed at 23° C. and 50% relative atmospheric humidity. The tests were each performed on three samples and the results were averaged.

The loop strength at a temperature of 23° C. and a relative humidity of 50% by rolling up a specimen blank in a single layer to form a cylinder 198 mm long having a diameter of 280 mm and clamping it at both ends into suitably shaped holders. The unsupported length of the cylinder formed by the film between the holders is 192 mm while simultaneously rotating them through 440° around the symmetry axis describing the cylinder, the holders are moved towards one another to a distance of 40 mm with a given number of cycles and a frequency of 35 cycles per minute. The films to be tested are kept in a climate of 23° C. and 50% relative atmospheric humidity for 7 days beforehand. The number of buckling breaks produced in this way in the film after a specified number of strokes can be determined by wetting the film with ammonia solution with simultaneous contact of the other side of the film with a sheet of diazo paper. The number of blue-black spots on the diazo paper produced by the ammonia and detectable after 15 min is assigned to the number of buckling breaks in the film portion investigated. In this case, the value is obtained as the average of the individual values of two test samples.

The cloudiness according to ASTM D 1003.

The gloss on the polyamide outside of the film at an angle of 20° according to DIN 67530.

The producibility as a blown film under the specified conditions. In particular, the fold formation of the film when laid flat was assessed. The categories producible (yes) and not producible (no) were distinguished.

The shrinkage of the film as a measure of the dimensional stability as the decrease in width, relative to the original width of the film, of the outermost layer of the finished film roll after three-week storage at 23° C. and 50% relative humidity.

Test Series 1

Three-layer coextruded blown films were manufactured with different polyamide compositions in the outer layer.

Comparison Example 1.1 (C1.1)

A film having the structure PA-1//HV//LDPE in the thicknesses 40//10//150 μm is produced as blown film by the conventional method for the production of blown films. The temperature of the cooling air is 20° C. The nozzle has a diameter of 300 mm and the film is laid flat over a width of 720 mm and then cut to a width of 700 mm. The parison was not, however, laid out on the winding mandrel. Immediately after cutting, the parison halves are separated and the film is wound up. The output rate of the nozzle is 100 kg/h. The PA-containing layer forms the outside of the film parison.

PA-1 is a polyamide 6 containing 600 ppm of ethylenebis(stearyl)amide and is nucleated with approximately 150 ppm of talcum. The coupling agent is an LLDPE grafted with maleic anhydride having a density of 920 kg/m³ and an MFI of 2.7 g/10 min measured at 190° C. with an applied weight of 2.16 kg. A material having a density of 928 kg/m³ and an MFI of 1 g/min measure at 190° C. with an applied weight of 2.16 kg Comparison Example 1.2 (C1.2)

The film from Comparison Example 1.1 is manufactured with the structure PA-2//HV//LDPE by the method and also with the same layer thicknesses, the same, coupling agent and LDPE as in Comparison Example 1. PA-2 is a polyamide 6 containing 2 wt % of montmorillonite. The montmorillonite is present in dispersed form as platelets as a result of suitable digestion. The platelets have a thickness of approximately 1 nm and a diameter of 100 to 1000 nm.

Comparison Example 1.3 (C1.3)

The film from Comparison Example 1.1 is manufactured with the structure PA-3// HV//LDPE by the method and with the same layer thicknesses, the same coupling agent and LDPE as in Comparison Example 1. PA-3 is a copolyamide of the type PA6/IPDI having a melting point of 210° C. It is not nucleated. The copolyamide is additionally provided with 2000 ppm of a synthetic silicon dioxide as antiblocking agent. The silicon dioxide used has a particle diameter of approximately 8 μm.

The table below lists the properties measured on the three-layer films of Test Series 1:

TABLE

Properties of films from Test Series 1.

| Feature (unit) | Example (B) or Comparison Example (C) Structure PA//HV//LDPE, 40//10//150 μm | | |
|---|---|---|---|
| | C1.1 | C1.2 | C1.3 |
| Polyamide | PA6 | PA6 containing 2% montmorillonite | PA6/IPDI |
| Gloss (gloss units) | 51 | 91 | 83 |
| Cloudiness (%) | 22 | 12 | 14 |
| Number of holes after 250 strokes | 6 | 13.5 | 3 |
| Puncture work (N cm) | 1.1 | 0.8 | 1.2 |
| Coefficient of static friction for film/film at 23° C. (-) | 0.31 | 0.37 | 1.6 |
| Shrinkage after production (%) | 0.5 | 0.3 | 1.4 |
| Producibility | yes | no* | yes |

It can be seen that good optical properties are obtained in the form of gloss and cloudiness by using a copolyamide (C1.3) in the outer layer. However, this film is found to have low surface slip and post-shrinks considerably on the roll. The use of pure polyamide 6 in the outer layer results in an optically unattractive film, whereas, although outer polyamide containing 2% nanoscale dispersed sheet silicate produces an optically attractive film that does not post-shrink, it has too low a loop strength and puncture strength.

All the films of Test Series 1 do not fulfil the requirements of the object set here.

Test Series 2

Three-layer and five-layer films having an outer layer of polyamide 6 with 2% nanoscale sheet silicate dispersed in it were produced.

Comparison Example 2.1

Identical to Comparison Example 1.2.

Comparison Example 2.2 (C2.2)

A film having the structure PA-2//HV//PA-1 //HV//LDPE is produced with the thicknesses 20//10//20//10//140 μm as blown film by the method and with the same coupling agent and LDPE as in Comparison Example 1.1 PA-2 is the polyamide from Comparison Example 1.2. and PA-1 is the polyamide from Comparison Example 1.1.

Example 2.3 (E2.3)

Film as in Comparison Example 2.2, but with the layer thicknesses 5//10//35//10//140 µm.

Comparison Example 2.4 (C2.4)

Film as in Comparison Example 2.2 having the structure PA-2//HV//PA2//HV//LDPE. The table below lists the properties measured on the three-layer and five-layer films of Test Series 2:

TABLE

Properties of films from Test Series 2.

Example (E) or Comparison Example (C) Structure PA*//HV//PA//HV//LDPE or PA*// HV//LDPE PA* = PA6 containing 2% nanoscale sheet silicate

| Feature (unit) | C2.1 | C2.2 | E2.3 | C2.4 |
|---|---|---|---|---|
| Thicknesses (µm) | 40/10/150 | 20/10/20/10/140 | 5/10/35/10/140 | 20/10/20/10/140 |
| Thickness of outer layer to thickness of all the PA layers (%) | 100 | 50 | 12.5 | 50 |
| PA of the inner layer | no inner layer | PA6 | PA6 | PA6 containing 2% montmorillonite |
| Gloss (gloss units) | 91 | 89 | 90 | 90 |
| Cloudiness (%) | 12 | 12 | 11 | 13 |
| Number of holes after 250 strokes | 13,5 | 11 | 7 | 15 |
| Puncture work (N cm) | 0,8 | 0,9 | 1.0 | 0.8 |
| Coefficient of static friction, film/film at 23° C. (–) | 0.37 | 0.33 | 0.35 | 0.40 |
| Shrinkage after production (%) | 0.3 | 0.4 | 0.5 | 0,3 |
| Producibility | no* | no* | Yes | no* |

Explanation Relating to Producibility

The film is so stiff that the film parison is not steady and forms folds when collapsed.

All the films have good optical properties, a high slip and a low shrinkage. Unduly large layer thicknesses of a polyamide 6 containing 2% nanodisperse montmorillonite results in a very stiff film that has disadvantages with regard to loop strength. In addition, such films prove to be unproducible as blown film. A film having 5 µm-thick outer layer of polyamide 6 containing 2% nanodisperse montmorillonite avoids these disadvantages and meets the object set here.

Test Series 3

Five-layer blown films having the structure PA//HV//PA//HV//LDPE were coextruded and had an inner layer of pure polyamide 6 and a thin outer layer of polyamide 6 with montmorillonite dispersed in it. In this series, the concentration of the sheet silicate was varied. The thickness distribution is 5//10//35//10//140 µm.

Example 3.1 (E3.1)

Identical to Example 2.3, i.e. a film having the structure PA-2//HV//PA-1//HV//LDPE containing PA-2 and PA1 from Comparison Examples 1.2 and 1.1.

Comparison Example 6 (C6)

Film as in Example 5 having the structure (5% PA-2+95% PA-1)//HV//PA-1//HV//LDPE.

Example 7 (E7)

Film as in Example 5 having the structure (10% PA-2+ 90% PA-1)//HV//PA-1//HV/LDPE.

Comparison Example 8 (C8)

Film as in Example 5 having the structure PA-4//HV//PA-1//HV//LDPE. PA-4is a polyamide 6 containing 5 wt % of montmorillonite. The montmorillonite is present in dispersed form as platelets as a result of suitable digestion. The platelets have a thickness of approximately 1 nm and a diameter of 100 to 1000 nm.

The table below lists the properties measured on the five-layer films of Test S3:

TABLE

Properties of films from Test Series 3.

Example (E) or Comparison Example (C) Structure PA//HV//PA'// HV//LDPE 5/10/35/10/140 µm PA' of the inner layer = pure PA6

| Feature (unit) | E3.1 | E3.2 | E3.3 | E3.4 |
|---|---|---|---|---|
| Proportion of sheet silicate in the outer layer (wt %) | 2 | 0.1 | 0.2 | 5 |
| Gloss (gloss units) | 90 | 63 | 85 | 93 |
| Cloudiness (%) | 11 | 20 | 13 | 12 |
| Number of holes after 250 strokes | 7 | 5.5 | 6.5 | 24 |
| Puncture work (N cm) | 1.0 | 1.0 | 1.0 | 0.6 |
| Coefficient of static friction, film/film at 23° C. (–) | 0.35 | 0.30 | 0.32 | 0.32 |
| Shrinkage after production (%) | 0.5 | 0.6 | 0.6 | 0.5 |
| Producibility | yes | yes | yes | no* |

Explanation Relating to Producibility

The film is so stiff that the film parison is unsteady and forms folds when collapsed.

Accordingly, an optimum concentration range of the nanodisperse nucleating agent in the outer layer is between 0.1 and 3 wt %. Unduly low loadings result in deteriorating optical properties, whereas unduly high loadings result in turn in an embrittling effect and in low loop strengths and problems during the manufacture.

What is claimed is:

1. Multilayer film having an outer polyamide layer containing nanoscale particulate nucleating agents and at least one further polyamide layer, wherein the polyamide forming the outer layer is made of at least 90% polyamide 6 and the smallest constituents of the particles dispersed in the outer layer forming a rigid unit in the dispersion having as a number-weighted average of all the constituents a dimension of not more than 100 nm in at least one direction that can be arbitrarily chosen for each constituent and wherein crystalline structures originate from the surface of the particles dispersed therein and all the further polyamide layers contain the particles contained in the outer layer at a level of not more than one tenth of the proportion by weight of the particles in the outer layer, and the thickness of the outer layer is less than 50% of the total thickness of all the layers containing polyamide, said multilayer film optionally comprising a heat-sealable coating.

2. The multilayer film of claim 1 wherein the proportion by weight of the particles dispersed in the outer layer, relative to the total weight of the composition forming the outer layer, is between 0.1 and 3 wt. %.

3. The multilayer film of claim 1 wherein the addition to polyamide 6, the outer layer contains a polyamide selected from the group consisting of polyamide 10, polyamide 12, polyamide 66, polyamide 610, polyamide 6I, polyamide 612, polyamide 6/66, polyamide 6I/6T, polyamide MXD6, polyamide 6/6I, polyamide 6/6T, polyamide 6/IPDI, copolymers of monomer forming said polymers, and mixtures thereof.

4. The multilayer film of claim 1, wherein the particles dispersed in the outer layer comprise particles that have an aspect ratio of at least 10 in two randomly selectable directions.

5. The multilayer film of claim 4 wherein the particles dispersed in the outer layer are sheet silicates.

6. The multilayer film of claim 1 wherein said multilayer film contains one or more EVOH-containing layers.

7. The multilayer film of claim 1 wherein said multilayer film has an at least monolayer heat-sealable coating on that side of the multilayer film remote from the outer polyamide layer.

8. The multilayer film of claim 1 wherein said multilayer film contains one or more coupling layers.

9. The multilayer film of claim 1 wherein in addition to the outer layer and one or more further layers composed of polyamide, which outer layer and further layers optionally comprise conventional additives said multilayer film optionally further comprises one or more EVOH-containing layers, one or more heat-sealable coatings, one or more coupling layers, or any combination thereof, and said multilayer film additionally contain one or more further polymeric layers or a layer of a metal oxide or nonmetal oxide between two inner layers.

10. The multilayer film of claim 1, wherein at least one outer layer, optionally also a plurality of or all the layers are subjected after extrusion to a stretching operation selected from: stretching only in the longitudinal direction; stretching only in the transverse direction; stretching first in the longitudinal direction and then in the transverse direction; stretching simultaneously in the longitudinal direction and transverse direction; and combinations thereof.

11. The multilayer film claim 1, wherein said multilayer film is produced as a blown film by coextrusion.

12. A method of using the multilayer film of claim 1 comprising packaging foodstuffs with the multilayer film.

* * * * *

UNITED STATES PATENT AND TRADEMARK OFFICE
CERTIFICATE OF CORRECTION

PATENT NO. : 6,740,422 B1
DATED : May 25, 2004
INVENTOR(S) : Eggers et al.

It is certified that error appears in the above-identified patent and that said Letters Patent is hereby corrected as shown below:

Column 3,
Line 10, "purepolyamide" should read -- pure polyamide --

Column 4,
Line 57, "polyamide 6 polyamide" should read -- polyamide 6, polyamide --
Line 63, "layer, contains" should read -- layer contains --

Column 5,
Line 52, "mixtures, of polymers" should read -- mixtures of polymers --

Column 6,
Line 46, "0.02to" should read -- 0.02 to --
Lines 62-63, "In a particularly prefered form an, EVOH-containing, layer" should read -- In a particularly preferred form, an EVOH-containing layer --

Column 10,
Line 8, "the same, coupling agent" should read -- the same coupling agent --

Signed and Sealed this

Twenty-fifth Day of January, 2005

JON W. DUDAS
*Director of the United States Patent and Trademark Office*